United States Patent
Springer

(10) Patent No.: US 11,470,162 B2
(45) Date of Patent: Oct. 11, 2022

(54) INTELLIGENT CONFIGURATION OF PERSONAL ENDPOINT DEVICES

(71) Applicant: Zoom Video Communications, Inc., San Jose, CA (US)

(72) Inventor: Shane Paul Springer, Manchester, MI (US)

(73) Assignee: ZOOM VIDEO COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 17/163,443

(22) Filed: Jan. 30, 2021

(65) Prior Publication Data

US 2022/0247824 A1   Aug. 4, 2022

(51) Int. Cl.
*H04L 12/18* (2006.01)
*H04L 67/147* (2022.01)
(Continued)

(52) U.S. Cl.
CPC .......... *H04L 67/147* (2013.01); *G06K 9/6256* (2013.01); *H04L 12/1813* (2013.01);
(Continued)

(58) Field of Classification Search
CPC ..... H04W 4/02–029; H04W 24/00–10; H04W 64/00–006; H04L 12/1813–1831;
(Continued)

(56) References Cited

U.S. PATENT DOCUMENTS

| | | | | |
|---|---|---|---|---|
| 5,490,247 A | * | 2/1996 | Tung | .................. H04L 12/1813 345/501 |
| 5,506,954 A | * | 4/1996 | Arshi | ........................ G06T 1/00 345/501 |

(Continued)

FOREIGN PATENT DOCUMENTS

KR        2014 0074129 A       6/2014

OTHER PUBLICATIONS

Wu, Jian, Soumya Jyoti Behera, and Radu Stoleru. "Meeting Room State Detection Using Environmental Wi-Fi Signature." Proceedings of the 15th ACM International Symposium on Mobility Management and Wireless Access. 2017. (Year: 2017).*

(Continued)

*Primary Examiner* — Glenton B Burgess
*Assistant Examiner* — Julian Chang
(74) *Attorney, Agent, or Firm* — Cognition IP, P.C.; Edward Steakley; Aroon Karuna

(57) ABSTRACT

Methods, systems, and apparatus, including computer programs encoded on computer storage media provide for the intelligent configuration of personal endpoint devices for video communication. The system identifies, within a room, a personal endpoint device to be used in a video communication session, then authenticates the personal endpoint device. The system then performs one or more diagnostic operations to receive diagnostic output from the personal endpoint device. The system processes the diagnostic output to determine a unique broadcasting signature of the room, (Continued)

and determines whether an existing optimal settings configuration of the personal endpoint device can be detected for the room. If an optimal settings configuration is detected, the setup dynamically configures one or more parameters of the personal endpoint device to match the optimal settings configuration. If not, then the system determines a new optimal settings configuration and stores it for future video communication in the room.

20 Claims, 7 Drawing Sheets

(51) Int. Cl.
  *H04L 67/306* (2022.01)
  *G06K 9/62* (2022.01)
  *H04L 9/40* (2022.01)
  *H04L 67/00* (2022.01)
(52) U.S. Cl.
  CPC ...... *H04L 12/1827* (2013.01); *H04L 63/0876* (2013.01); *H04L 67/306* (2013.01); *H04L 67/34* (2013.01)
(58) Field of Classification Search
  CPC ..... H04L 67/14–148; H04L 67/30–306; H04L 67/34
  See application file for complete search history.

(56) References Cited

U.S. PATENT DOCUMENTS

| | | | | |
|---|---|---|---|---|
| 6,125,398 | A * | 9/2000 | Mirashrafi | H04L 12/1822 370/263 |
| 8,244,277 | B1 * | 8/2012 | Cha | H04M 1/72457 455/414.1 |
| 8,499,245 | B1 * | 7/2013 | Froment | H04L 67/535 715/744 |
| 8,613,070 | B1 * | 12/2013 | Borzycki | H04L 67/104 726/8 |
| 8,789,094 | B1 * | 7/2014 | Singh | G06F 3/04842 725/37 |
| 9,088,689 | B2 * | 7/2015 | Navon | H04L 12/18 |
| 9,137,308 | B1 * | 9/2015 | Petrou | G06F 16/00 |
| 9,148,742 | B1 * | 9/2015 | Koulomzin | H04W 4/00 |
| 9,264,861 | B1 * | 2/2016 | Arastafar | H04W 4/33 |
| 9,270,941 | B1 * | 2/2016 | Lavelle | H04N 7/147 |
| 9,419,842 | B1 * | 8/2016 | Galliher, III | H04L 49/1515 |
| 9,521,648 | B1 * | 12/2016 | Kolekar | H04W 76/14 |
| 9,571,628 | B1 * | 2/2017 | Bostick | G06K 9/00315 |
| 9,698,924 | B2 * | 7/2017 | Kalampoukas | G06F 16/951 |
| 9,781,575 | B1 * | 10/2017 | Wan | H04W 4/33 |
| 9,798,933 | B1 * | 10/2017 | Meisser | H04N 5/232935 |
| 9,800,931 | B1 * | 10/2017 | Tangeland | H04N 21/4312 |
| 9,843,606 | B1 * | 12/2017 | Vendrow | H04L 65/403 |
| 9,973,732 | B1 * | 5/2018 | Goetz | H04N 5/2628 |
| 10,027,926 | B1 * | 7/2018 | Schirdewahn | H04N 7/147 |
| 10,044,871 | B2 * | 8/2018 | Bargetzi | H04N 7/15 |
| 10,263,799 | B1 * | 4/2019 | Jouhikainen | H04L 12/1818 |
| 10,348,786 | B1 * | 7/2019 | Petit-Huguenin | H04L 12/1827 |
| 10,397,749 | B1 * | 8/2019 | Barua | H04W 4/06 |
| 10,581,625 | B1 * | 3/2020 | Pandey | H04N 7/147 |
| 10,721,521 | B1 | 7/2020 | Robinson | |
| 10,887,633 | B1 * | 1/2021 | Stolarz | H04N 21/4788 |
| 10,904,488 | B1 * | 1/2021 | Weisz | H04N 7/152 |
| 10,958,457 | B1 * | 3/2021 | Davis | G06Q 10/1095 |
| 10,999,346 | B1 * | 5/2021 | Yang | H04L 65/1086 |
| 11,018,887 | B2 * | 5/2021 | Balasubramanian | H04L 12/2807 |
| 11,089,134 | B1 * | 8/2021 | Gordon | G06F 1/169 |
| 11,190,735 | B1 * | 11/2021 | Trim | G06V 20/52 |
| 11,257,511 | B1 * | 2/2022 | Peeler | H04S 7/303 |
| 11,310,464 | B1 * | 4/2022 | Swierk | H04N 7/152 |
| 2004/0127198 | A1 * | 7/2004 | Roskind | H04M 19/044 455/412.2 |
| 2004/0249889 | A1 * | 12/2004 | Drommond | H04L 29/06027 709/204 |
| 2005/0001904 | A1 * | 1/2005 | Kiiskinen | G06F 16/58 707/E17.026 |
| 2005/0051708 | A1 * | 3/2005 | Hotelling | G01J 1/00 250/214 AL |
| 2005/0221844 | A1 * | 10/2005 | Trethewey | H04M 1/72457 455/456.6 |
| 2006/0010240 | A1 * | 1/2006 | Chuah | G06Q 50/01 709/228 |
| 2007/0127879 | A1 * | 6/2007 | Frank | H04N 21/4223 348/E5.002 |
| 2007/0162960 | A1 * | 7/2007 | Takahashi | H04W 12/06 726/4 |
| 2007/0185980 | A1 * | 8/2007 | Abraham | H04L 41/12 709/222 |
| 2007/0285507 | A1 * | 12/2007 | Gorzynski | H04N 7/144 348/E7.083 |
| 2008/0016182 | A1 * | 1/2008 | Sathish | H04L 67/02 709/219 |
| 2008/0239995 | A1 * | 10/2008 | Lee | H04L 12/1818 370/260 |
| 2008/0256097 | A1 * | 10/2008 | Messer | H04W 4/029 |
| 2008/0281952 | A1 * | 11/2008 | Fedotenko | H04W 76/00 709/223 |
| 2008/0299951 | A1 * | 12/2008 | Karkanias | H04L 67/306 455/414.1 |
| 2009/0048848 | A1 * | 2/2009 | Krig | G10L 19/167 704/500 |
| 2009/0088221 | A1 * | 4/2009 | Gilbert | H04M 1/72454 455/567 |
| 2009/0146982 | A1 * | 6/2009 | Thielman | H05B 47/11 345/207 |
| 2009/0156209 | A1 * | 6/2009 | Franklin | H04L 12/5692 455/435.2 |
| 2009/0319913 | A1 * | 12/2009 | Serr | H04L 12/1827 715/753 |
| 2010/0135501 | A1 * | 6/2010 | Corbett | H04S 7/301 381/58 |
| 2010/0241845 | A1 * | 9/2010 | Alonso | H04N 21/4788 715/753 |
| 2010/0255781 | A1 * | 10/2010 | Wirola | G01S 19/34 455/67.11 |
| 2011/0032324 | A1 * | 2/2011 | George | H04N 7/15 348/E7.083 |
| 2011/0149802 | A1 * | 6/2011 | Fok Ah Chuen | H04L 67/563 370/254 |
| 2011/0153738 | A1 * | 6/2011 | Bedingfield | H04L 65/403 709/204 |
| 2011/0200183 | A1 * | 8/2011 | Erhart | H04M 3/568 379/202.01 |
| 2011/0295392 | A1 * | 12/2011 | Cunnington | G06Q 10/10 702/19 |
| 2012/0115501 | A1 * | 5/2012 | Zheng | H04W 4/185 455/456.1 |
| 2012/0158203 | A1 * | 6/2012 | Feldstein | G06F 1/3231 713/320 |
| 2012/0254382 | A1 * | 10/2012 | Watson | H04W 64/00 709/221 |
| 2012/0293605 | A1 * | 11/2012 | Seferian | H04N 7/15 348/E7.083 |
| 2012/0320144 | A1 * | 12/2012 | Samadani | H04N 7/15 348/E7.083 |
| 2013/0028443 | A1 * | 1/2013 | Pance | G06F 3/0484 381/107 |
| 2013/0076261 | A1 * | 3/2013 | Wang | H05B 45/20 315/297 |
| 2013/0079031 | A1 * | 3/2013 | Kuhn | H04W 4/023 455/456.1 |
| 2013/0095757 | A1 * | 4/2013 | Abdelsamie | H04W 4/50 455/41.1 |
| 2013/0103810 | A1 * | 4/2013 | Papakipos | H04W 4/025 709/221 |

(56) References Cited

U.S. PATENT DOCUMENTS

| | | | | |
|---|---|---|---|---|
| 2013/0182603 A1* | 7/2013 | Twell | H04W 4/02 | 370/252 |
| 2013/0222137 A1* | 8/2013 | Alameh | H04M 1/72454 | 340/573.1 |
| 2013/0263216 A1* | 10/2013 | Vakil | G06F 21/31 | 726/3 |
| 2013/0325407 A1* | 12/2013 | Lee | G06F 17/00 | 702/188 |
| 2014/0074537 A1* | 3/2014 | Bargetzi | G08C 17/02 | 705/7.19 |
| 2014/0100835 A1* | 4/2014 | Majumdar | G06N 3/00 | 703/11 |
| 2014/0108084 A1* | 4/2014 | Bargetzi | H04W 4/80 | 705/7.19 |
| 2014/0139609 A1* | 5/2014 | Lu | G06T 11/60 | 348/14.03 |
| 2014/0156833 A1* | 6/2014 | Robinson | H04L 43/12 | 709/224 |
| 2014/0168176 A1* | 6/2014 | Nowatzyk | G06F 3/0346 | 345/179 |
| 2014/0187258 A1* | 7/2014 | Khorashadi | H04W 4/023 | 455/456.1 |
| 2014/0267202 A1* | 9/2014 | Zheng | G09G 5/10 | 345/207 |
| 2014/0267558 A1* | 9/2014 | Verthein | H04L 65/4038 | 348/14.08 |
| 2014/0269531 A1* | 9/2014 | Luna | H04M 1/72454 | 370/329 |
| 2014/0280991 A1* | 9/2014 | Lederman | H04L 67/306 | 709/228 |
| 2014/0283136 A1* | 9/2014 | Dougherty | H04W 4/02 | 726/29 |
| 2014/0335893 A1* | 11/2014 | Ronen | H04W 4/026 | 455/456.1 |
| 2015/0009278 A1* | 1/2015 | Modai | H04N 7/15 | 348/14.08 |
| 2015/0089551 A1* | 3/2015 | Bruhn | H04N 5/58 | 725/80 |
| 2015/0110282 A1* | 4/2015 | Sun | H04M 9/082 | 381/66 |
| 2015/0169204 A1* | 6/2015 | Deselaers | G06F 3/0482 | 715/835 |
| 2015/0172337 A1* | 6/2015 | Moran | H04N 21/25891 | 725/39 |
| 2015/0213650 A1 | 7/2015 | Barzura | | |
| 2015/0222854 A1* | 8/2015 | Lachapelle | H04N 7/152 | 348/14.08 |
| 2015/0237303 A1* | 8/2015 | Thapliyal | H04N 7/15 | 348/14.01 |
| 2015/0245043 A1* | 8/2015 | Greenebaum | H04N 19/124 | 375/240.25 |
| 2015/0264315 A1* | 9/2015 | Kitazawa | H04N 7/15 | 348/14.08 |
| 2015/0271392 A1* | 9/2015 | Musgrave | G09G 3/3406 | 348/207.11 |
| 2015/0373474 A1* | 12/2015 | Kraft | H04W 4/029 | 381/17 |
| 2016/0180259 A1* | 6/2016 | Marianko | H04L 65/1069 | 705/5 |
| 2016/0189726 A1* | 6/2016 | Raniwala | H04M 3/568 | 704/227 |
| 2016/0205305 A1* | 7/2016 | McCarthy | H04W 4/80 | 348/366 |
| 2016/0267923 A1* | 9/2016 | Goto | H04M 3/568 | |
| 2016/0277242 A1* | 9/2016 | Sallam | H04L 12/1831 | |
| 2016/0337459 A1* | 11/2016 | Sallam | H04L 67/12 | |
| 2016/0350058 A1* | 12/2016 | Zhu | H04N 21/4183 | |
| 2017/0006162 A1* | 1/2017 | Bargetzi | H04W 4/06 | |
| 2017/0060399 A1* | 3/2017 | Hough | H04L 67/306 | |
| 2017/0163788 A1* | 6/2017 | Andersen | H04M 3/567 | |
| 2017/0180558 A1* | 6/2017 | Li | H04M 3/568 | |
| 2017/0230767 A1* | 8/2017 | Simonides | H04R 25/505 | |
| 2017/0230788 A1* | 8/2017 | Simonides | H04R 25/505 | |
| 2017/0245125 A1* | 8/2017 | Child | H04W 4/12 | |
| 2017/0286845 A1* | 10/2017 | Gifford | G06Q 30/02 | |
| 2017/0339216 A1* | 11/2017 | Carlos | H04L 67/142 | |
| 2017/0353542 A1* | 12/2017 | Hammadou | H04L 67/1008 | |
| 2017/0357917 A1* | 12/2017 | Holmes | G06Q 10/1093 | |
| 2017/0359216 A1* | 12/2017 | Naiden | H04L 67/34 | |
| 2018/0007099 A1* | 1/2018 | Ein-Gil | G06F 9/4856 | |
| 2018/0109627 A1* | 4/2018 | Marquardt | H04L 43/08 | |
| 2018/0182375 A1* | 6/2018 | Fomin | G10L 15/26 | |
| 2018/0192208 A1* | 7/2018 | Zhang | H04R 25/305 | |
| 2018/0203425 A1* | 7/2018 | Anderson | G05B 11/01 | |
| 2018/0211607 A1* | 7/2018 | Kabacinski | G09G 3/20 | |
| 2018/0275860 A1* | 9/2018 | Dellinger | H04M 1/72412 | |
| 2018/0277133 A1* | 9/2018 | Deetz | G10L 21/0208 | |
| 2018/0317046 A1* | 11/2018 | Brooks | H04W 64/00 | |
| 2018/0367326 A1* | 12/2018 | Esken | G06F 9/4411 | |
| 2019/0050403 A1* | 2/2019 | Frieder | H04W 4/021 | |
| 2019/0068389 A1* | 2/2019 | Chitre | H04L 12/1863 | |
| 2019/0095251 A1* | 3/2019 | Wang | G06F 9/4856 | |
| 2019/0101306 A1* | 4/2019 | Giorgi | F24F 11/74 | |
| 2019/0116448 A1 | 4/2019 | Schmidt | | |
| 2019/0158309 A1* | 5/2019 | Park | H04L 12/2832 | |
| 2019/0166674 A1* | 5/2019 | Mason | H04N 21/8133 | |
| 2019/0272509 A1* | 9/2019 | Livnat | H04W 4/33 | |
| 2019/0333025 A1* | 10/2019 | Adamson | G06Q 10/063116 | |
| 2019/0387352 A1 | 12/2019 | Jot | | |
| 2019/0394057 A1* | 12/2019 | Bujnowski | G06Q 10/06 | |
| 2020/0076634 A1* | 3/2020 | Akolkar | H04L 47/72 | |
| 2020/0100121 A1* | 3/2020 | Cookman | H04W 88/06 | |
| 2020/0137175 A1* | 4/2020 | Ganci, Jr | H04L 67/125 | |
| 2020/0162274 A1* | 5/2020 | Iyer | H04N 7/15 | |
| 2020/0186382 A1* | 6/2020 | Harel | G06N 5/003 | |
| 2020/0213360 A1* | 7/2020 | Ojha | H04W 40/34 | |
| 2020/0221240 A1* | 7/2020 | Pye | H03G 5/165 | |
| 2020/0234251 A1* | 7/2020 | Ma | G07C 9/37 | |
| 2020/0259948 A1* | 8/2020 | Keohane | G06F 1/1694 | |
| 2020/0274726 A1* | 8/2020 | Setteboun | G06F 3/04817 | |
| 2020/0302344 A1* | 9/2020 | Just | G06F 21/34 | |
| 2020/0341625 A1* | 10/2020 | Roedel | H04N 7/147 | |
| 2020/0351537 A1* | 11/2020 | Browy | H04N 21/4126 | |
| 2020/0382747 A1* | 12/2020 | Prins | H04S 7/303 | |
| 2020/0386843 A1* | 12/2020 | Tan | G01S 5/18 | |
| 2021/0004409 A1* | 1/2021 | Zamora Duran | H04L 67/306 | |
| 2021/0136510 A1* | 5/2021 | Tang | G06N 3/084 | |
| 2021/0173532 A1* | 6/2021 | Van der Keere | G06F 3/0488 | |
| 2021/0191735 A1* | 6/2021 | Clark | G06F 3/165 | |
| 2021/0195354 A1* | 6/2021 | Cavenaugh | G06F 3/013 | |
| 2021/0218784 A1* | 7/2021 | Geiselhart | H04L 12/1818 | |
| 2021/0352120 A1* | 11/2021 | Masi | H04L 65/403 | |
| 2021/0360311 A1* | 11/2021 | Richardson | H04L 63/0853 | |
| 2021/0360425 A1* | 11/2021 | Tran | G01S 17/89 | |
| 2021/0373676 A1* | 12/2021 | Jorasch | A63F 13/285 | |
| 2021/0374391 A1* | 12/2021 | Jorasch | G06V 40/10 | |
| 2021/0383804 A1* | 12/2021 | Makker | E06B 3/6722 | |
| 2021/0390953 A1* | 12/2021 | Makker | G06F 21/32 | |
| 2021/0409465 A1* | 12/2021 | Garrett | H04N 7/152 | |
| 2022/0020388 A1* | 1/2022 | Trim | H04M 3/2236 | |
| 2022/0021551 A1* | 1/2022 | Trim | H04L 12/1827 | |
| 2022/0092551 A1* | 3/2022 | Naganuma | G06Q 10/103 | |
| 2022/0107713 A1* | 4/2022 | Covell | H04L 67/306 | |
| 2022/0110202 A1* | 4/2022 | Murthy | H05B 47/16 | |
| 2022/0124129 A1* | 4/2022 | Osaki | H04W 76/30 | |
| 2022/0124456 A1* | 4/2022 | Nurminen | H04W 4/33 | |

OTHER PUBLICATIONS

Jiang, Yifei, et al. "Ariel: Automatic wi-fi based room fingerprinting for indoor localization." Proceedings of the 2012 ACM conference on ubiquitous computing. 2012. (Year: 2012).*

Bolliger, Philipp. "Redpin-adaptive, zero-configuration indoor localization through user collaboration." Proceedings of the first ACM international workshop on Mobile entity localization and tracking in GPS-less environments. 2008. (Year: 2008).*

M. Jiang, J. Lundgren, S. Pasha, M. Carratù, C. Liguori and G. Thungström, "Indoor Silent Object Localization using Ambient Acoustic Noise Fingerprinting," 2020 IEEE International Instru-

(56) References Cited

OTHER PUBLICATIONS mentation and Measurement Technology Conference (I2MTC), 2020, pp. 1-6, doi: 10.1109/I2MTC43012.2020.9129086. (Year: 2020).*

Wang, Mei, et al. "Acoustic Fingerprints Optimization based on Principal Component Analysis for Indoor Subarea Location." Proceedings of the 2020 International Conference on Aviation Safety and Information Technology. 2020. (Year: 2020).*

Tarzia, Stephen P., et al. "Indoor localization without infrastructure using the acoustic background spectrum." Proceedings of the 9th international conference on Mobile systems, applications, and services. 2011. (Year: 2011).*

Rossi, Mirco, et al. "RoomSense: an indoor positioning system for smartphones using active sound probing." Proceedings of the 4th Augmented Human International Conference. 2013. (Year: 2013).*

R. Jia, M. Jin, Z. Chen and C. J. Spanos, "SoundLoc: Accurate room-level indoor localization using acoustic signatures," 2015 IEEE International Conference on Automation Science and Engineering (CASE), 2015, pp. 186-193, doi: 10.1109/CoASE.2015.7294060. (Year: 2015).*

O. Vinyals, E. Martin and G. Friedland, "Multimodal Indoor Localization: An Audio-Wireless-Based Approach," 2010 IEEE Fourth International Conference on Semantic Computing, 2010, pp. 120-125, doi: 10.1109/ICSC.2010.87. (Year: 2010).*

M. A. Shah, K. A. Harras and B. Raj, "Sherlock: A Crowd-sourced System for Automatic Tagging of Indoor Floor Plans," 2020 IEEE 17th International Conference on Mobile Ad Hoc and Sensor Systems (MASS), 2020, pp. 594-602, doi: 10.1109/MASS50613.2020.00078. (Year: 2020).*

Azizyan, Martin, Ionut Constandache, and Romit Roy Choudhury. "Surroundsense: mobile phone localization via ambience fingerprinting." Proceedings of the 15th annual international conference on Mobile computing and networking. 2009. (Year: 2009).*

Galván-Tejada CE, Garcia-Vázquez JP, Galván-Tejada JI, Delgado-Contreras JR, Brena RF. Infrastructure-Less Indoor Localization Using the Microphone, Magnetometer and Light Sensor of a Smartphone. Sensors (Basel). 2015;15(8):20355-20372. Published Aug. 18, 2015. doi: 10.3390/s 150820355 (Year: 2015).*

International Search Report in PCT International Application No. PCT/US2021/064244, dated Apr. 25, 2022.

Ivan Dokmanic et al., "Can One Hear the Shape of a Room: The 2-D Polygonal Case," 2011 IEEE International Conference on Acoustics, Speech and Signal Processing, May 27, 2011, pp. 321-324.

Lawrence Bergman et al., "Workshop on behavior-based user interface customization," 2004 International Conference on Intelligent User Interfaces; Jan. 13-16, 2004, pp. 372-373.

* cited by examiner

INTELLIGENT CONFIGURATION OF PERSONAL ENDPOINT DEVICES

FIELD OF INVENTION

The present invention relates generally to digital communication, and more particularly, to systems and methods providing for the intelligent configuration of personal endpoint devices for video communication.

BACKGROUND

Many people are far more mobile and transient in their work environments than ever before, allowing them to work from many potential office spaces, hotel rooms, or home environments. Commercial shared workspaces have become increasingly popular. Remote work has also been gaining acceptability among companies which previously had prohibited it. It is not uncommon for office-based positions to be remote in nature, or at least flexible between remote and physical office setups. Many workers will thus use personal devices such as smartphones tablets, and laptop computers as their default endpoint devices for audio- and video-based conferences, webinars, and meetings since they are convenient and readily on hand.

While such setups can provide a great amount of flexibility and satisfaction, some problems have arisen. First, when the office environment changes frequently with little setup time associated, audio and video quality can often suffer. Understandably, most business professionals do not spend considerable amount of time in optimizing their audiovisual setups upon spending a day working from a particular hotel room, airport lounge, or conference break room. When needing to spend multiple days in a particular environment presenting and participating in video conferencing sessions, this suboptimal audio and video quality will persist. If the setup is optimized one day, it may not be optimized in a future session. In addition, if other colleagues or collaborators bring better endpoint devices for connecting the user's personal endpoint device, such settings may not persist in future sessions between such colleagues.

Thus, there is a need in the field of digital communication to create a new and useful system and method providing for the intelligent configuration of personal endpoint devices. The source of the problem, as discovered by the inventors, is a lack of device-agnostic methods for dynamically and intelligently optimizing the configuration of personal endpoint devices within rooms in a way that is persistent whenever the user returns to that room, and that quickly allows a user to get an optimal configuration within a new room based on similar previous rooms the device has been set up in.

SUMMARY

The invention overcomes the existing problems by providing for the dynamic, intelligent configuration of personal endpoint devices within a video conferencing context. This enables devices such as personal smartphones, tablets, and laptop computers to be used to drive optimal audio and video experiences quickly and efficiently with minimum manual configuration. Upon a person entering a room, a unique broadcasting signature of the room is determined using the output of the user's personal device(s), and then the system can determine whether an optimal settings configuration for that room and that personal endpoint device already exists (i.e., the person has been in this room before with an optimal configuration for that device). If so, the optimal configuration is used for that device. If not, then a new optimal configuration is automatically and dynamically generated for the room, then stored for future sessions. The optimal settings configuration represents optimized settings with respect to the personal endpoint device as it used within the specific room and its setup, to the extent that the system is able to optimize settings of that device for that room.

One embodiment relates to a method for providing intelligent configuration of personal endpoint devices for video communication. The system identifies, within a room, a personal endpoint device to be used in a video communication session, then authenticates the personal endpoint device with respect to a single user account of a video communication platform. The system then performs one or more diagnostic operations to receive diagnostic output from the personal endpoint device. The system processes the diagnostic output to determine a unique broadcasting signature of the room, and determines whether an existing optimal settings configuration of the personal endpoint device can be detected for the room based on the unique broadcasting signature of the room. If an optimal settings configuration is detected, the setup dynamically configures one or more parameters of the personal endpoint device to match the optimal settings configuration. If an optimal settings configuration is not detected, then the system processes the diagnostic output of the personal endpoint device to determine a new optimal settings configuration, and stores the new optimal settings configuration for future video communication in the room.

In some embodiments, identifying the personal endpoint device includes communicatively connecting the personal endpoint device to one or more additional endpoint devices over a network. In some embodiments, determining a new optimal settings configuration involves first determining, beyond a confidence threshold, a match similarity of the unique broadcasting signature of the room to a unique broadcasting signature of an additional room for which an optimal settings configuration can be detected for the endpoint device, and second, dynamically configuring one or more parameters of the personal endpoint devices to match the optimal settings configuration of the of the additional room.

In some embodiments, artificial intelligence (AI) processes and techniques, such as, e.g., machine learning (ML) and computer vision may be used to process the diagnostic outputs of the endpoint devices and to determine optimal settings configurations for the endpoint devices as well as unique broadcasting signatures of differing rooms. In some embodiments, one or more AI engines can be trained one datasets which include various configurations of personal endpoint devices within rooms of differing unique broadcasting signatures. The diagnostic outputs are then processed by the trained AI engines to determine optimal settings configurations for the personal endpoint devices and/or a unique broadcasting signature of the room.

In some embodiments, the system displays a room configuration interface at the personal endpoint device, including a first control interface for receiving a selection of an existing settings configuration for an additional room, and a second control interface for manually adjusting one or more parameters of the personal endpoint device with respect to the optimal settings configuration for that room.

In some embodiments, the system connects the personal endpoint device to one or more additional endpoint devices within the room. The system can then detect an existing optimal settings configuration for the pairing of the personal endpoint device to at least one of the additional endpoint devices, and determine the new optimal settings configuration comprises dynamically adjusting one or more parameters of the personal endpoint device to match the existing optimal settings configuration of the pairing of the devices.

In some embodiments, the system receives a selection from the client device of an automatable behavior to be performed with the room upon identifying the personal endpoint device within the room and beginning a video communication session. The system then stores the selection of the automatable behavior to be automatically performed at a future session within the room upon the personal endpoint being detected.

In some embodiments, the system is configured to store one or more of the diagnostic output, the unique broadcasting signature of the room, and/or the new optimal settings configuration as historical training data within a dataset, and then use that historical training data within the dataset to train one or more AI engines for future video communication sessions within the room.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for the intelligent configuration of endpoint devices within a video conferencing setup.

The present disclosure will become better understood from the detailed description and the drawings, wherein.

DETAILED DESCRIPTION

Figure 1A:
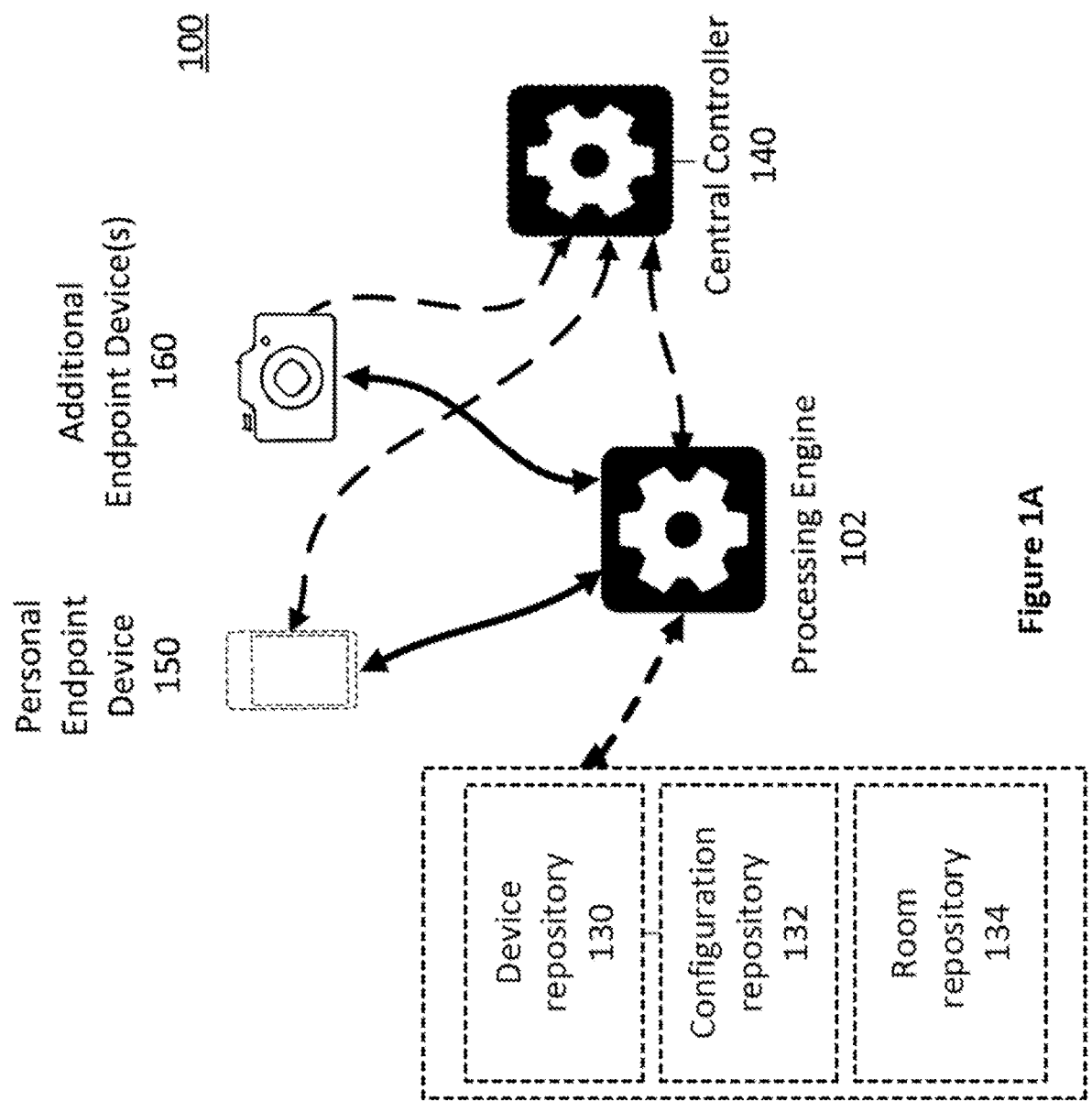
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Many other possibilities and options can be contemplated for this use case and others, as will be described in further detail throughout.

I. Exemplary Environments

FIG. 1A is a diagram illustrating an exemplary environment in which some embodiments may operate. In the exemplary environment 100, a personal endpoint device 150 and one or more additional endpoint device(s) 160 are connected to a processing engine 102 and, optionally, a central controller 140. The processing engine 102 can also be connected to the optional central controller 140, and optionally connected to one or more repositories and/or databases, including a device repository 130, configuration repository 132, and/or a room repository 134. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one personal endpoint device, one additional endpoint device, one processing engine, and one central controller, though in practice there may be more or fewer personal or additional endpoint devices, processing engines, and/or central controllers.

In an embodiment, the processing engine 102 may perform the methods 200 (FIG. 2A) and 240 (FIG. 2B) or other method herein and, as a result, provide intelligent configuration of personal endpoint devices within a video conferencing setup. In some embodiments, this may be accomplished via communication with the personal endpoint device and/or additional endpoint devices, processing engine, central controller, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The personal endpoint device 150 and endpoint device(s) 160 are devices which are capable of capturing and transmitting audio and/or video. In some embodiments, the devices may be, e.g., a smartphone, tablet or other mobile device, laptop computer, video camera, photo camera, microphone, audio capturing device, desktop computer, VR headset, or any other suitable device capable of capturing and transmitting audio and/or video. In some embodiments, the endpoint device is also capable of receiving audio and/or video from remote participants in a video session. In some embodiments, one or more of the endpoint devices are communicatively coupled to one another. This may be accomplished by a network, device mesh, beacon and/or signaling technology, or any other suitable way to communicatively connect endpoint devices. In some embodiments, the endpoint device(s) 150 present information in the form of a user interface (UI) with UI elements or components. In some embodiments, the endpoint device(s) 150 send and receive signals and/or information to the processing engine 102 and/or central controller 140. The endpoint device(s) are configured to perform functions related to presenting and, optionally, playing back video, audio, documents, annotations, and other materials within a video presentation (e.g., a virtual conference, meeting, class, lecture, webinar, or any other suitable video presentation) on a video communication platform. The endpoint devices are configured to present video and/or audio, and in some cases, access presented video and/or audio as well. In some embodiments, one or more endpoint device(s) are cameras or devices which include an embedded or connected camera. In some embodiments, this camera is capable of generating and transmitting video content in real time or substantially real time. For example, one or more of the endpoint devices may be smartphones with built-in cameras, and the smartphone operating software or applications may provide the ability to broadcast live streams based on the video generated by the built-in cameras. In some embodiments, one or more of the endpoint device(s) are associated with one or more user accounts on a video communication platform.

In some embodiments, multiple devices may be configured to connect together in a synchronized way. For example, multiple microphones may connect to one another to provide a coordinated microphone array which is used to capture audio.

In some embodiments, the optional central controller 140 can be a device which is configured to centrally connect and control the endpoint devices in the room. Such a device may contain instructions to intelligently and dynamically connect the disparate devices such that they are able to work in a coordinated fashion together for a given video conferencing context. In some embodiments, the central controller is configured to send instructions to the endpoint devices from the processing engine, to automatically configure one or more devices in relation to other devices, and perform similar tasks and operations with respect to the endpoint devices.

In some embodiments, optional repositories can include one or more of a device repository 130, configuration repository 132, and/or room repository 134. The optional repositories function to store and/or maintain, respectively, information associated with the endpoint device(s) 150, configuration profiles and settings for the endpoint device(s) 150, and room settings, including unique broadcasting signatures, for different rooms where video conferencing has or will take place. The optional database(s) may also store and/or maintain any other suitable information for the processing engine 102 or central controller 140 to perform elements of the methods and systems herein. In some embodiments, the optional database(s) can be queried by one or more components of system 100 (e.g., by the processing engine 102), and specific stored data in the database(s) can be retrieved.

Figure 1B:
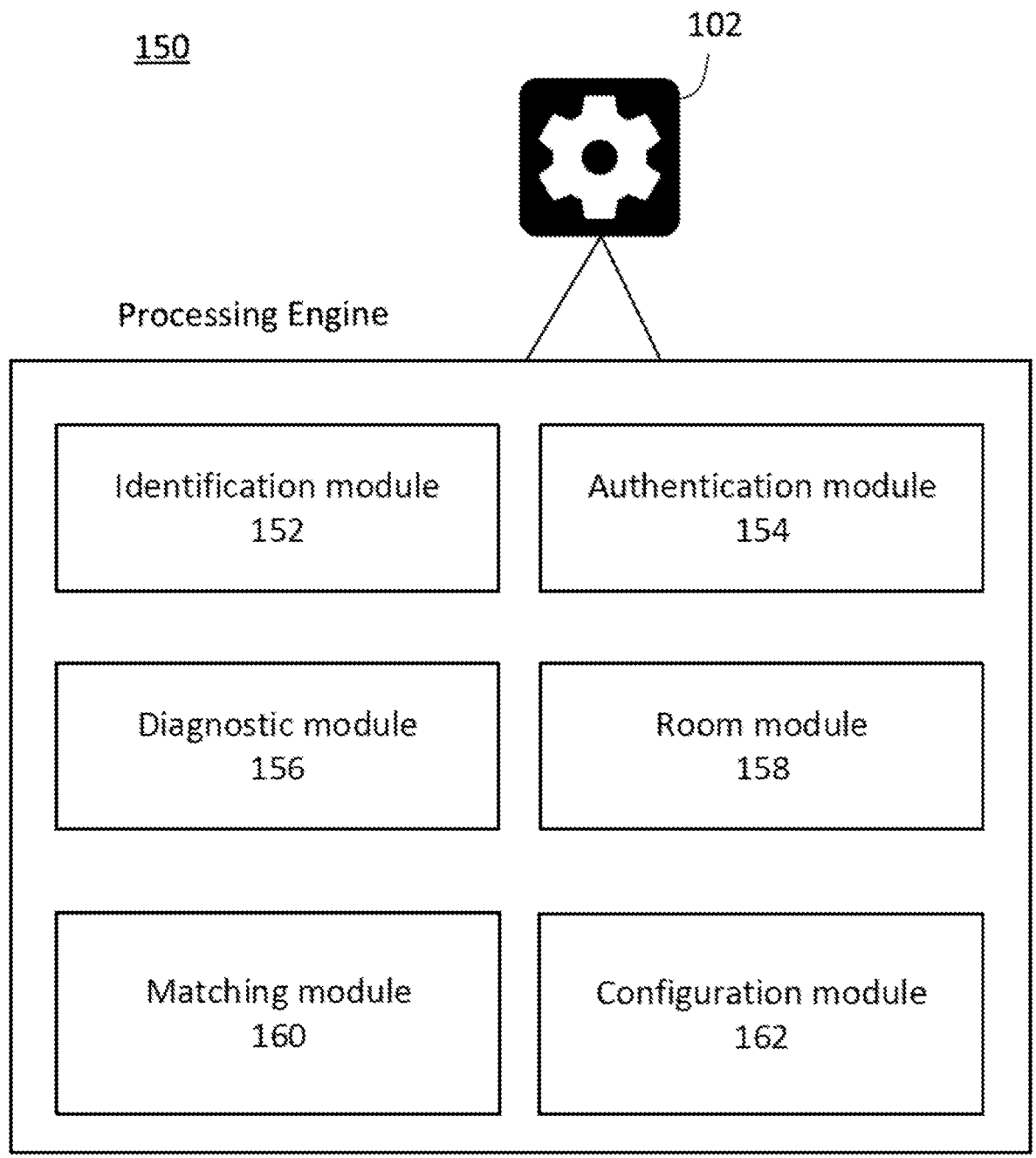
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Identification module 152 functions to identify personal endpoint devices and/or additional endpoint devices within a room.

Authentication module 154 functions to authenticate the personal endpoint device with respect to a single user account of a video communication platform.

Diagnostic module 156 performs one or more diagnostic operations to receive diagnostic output from personal endpoint devices.

Room module 158 functions to process the diagnostic output to determine a unique broadcasting signature of the room.

Matching module 160 functions to dynamically configure parameters of the personal endpoint device to match an existing optimal settings configuration that was detected.

Configuration module 162 functions to process the diagnostic output of the personal endpoint device to determine an optimal settings configuration, then stores the optimal settings configuration for future video communication in the room.

The above modules and their functions will be described in further detail in relation to an exemplary method below.

II. Exemplary Method

Figure 2A:
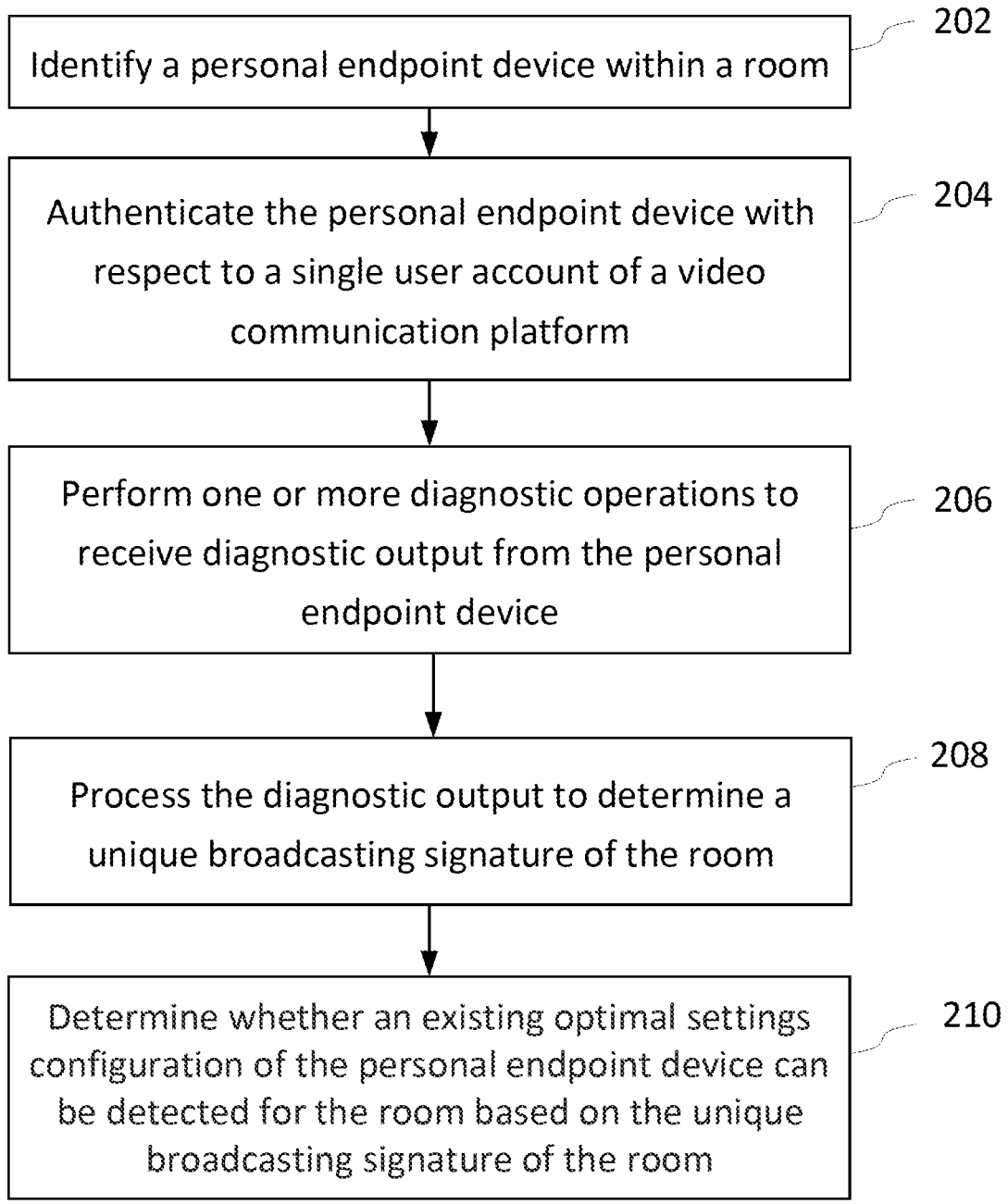
FIG. 2A is a flow chart illustrating an exemplary method 200 that may be performed in some embodiments.

FIG. 2A is a flow chart illustrating an exemplary method that may be performed in some embodiments.

At step 202, the system identifies a personal endpoint device within the room which is communicatively connected. The personal endpoint device is configured to capture video and/or audio and transmit them to at least one processing engine, central controller, or some combination thereof. The personal endpoint device may be, e.g., one or more video cameras or photo cameras, microphones, audio recorders, smartphones with audio and/or video inputs and/or outputs, tablets or other mobile devices, desktop or laptop computers, VR headsets, or any other suitable devices capable of capturing audio and/or video and transmitting them.

In some embodiments, identifying the personal endpoint device comprises communicatively connecting the personal endpoint device to one or more additional endpoint devices over a network. In some embodiments, the personal device can be communicatively connected over a network, device mesh, Bluetooth and/or signaling technologies, or any other suitable method of communicatively connecting devices with one another. In some embodiments, the device is connected to a central controller, which in turn can connect the device to one or more additional endpoint devices. In some embodiments, the devices are connected locally via a mesh network, i.e., a local network topology in which the devices connect directly, dynamically and non-hierarchically to other devices within the network. In some embodiments, the devices are connected via a local house network or similar network. In some embodiments, the devices are connected via Bluetooth signaling or beacon technologies which are configured to determine a proximity and/or positioning of endpoint devices within the room.

Figure 3:
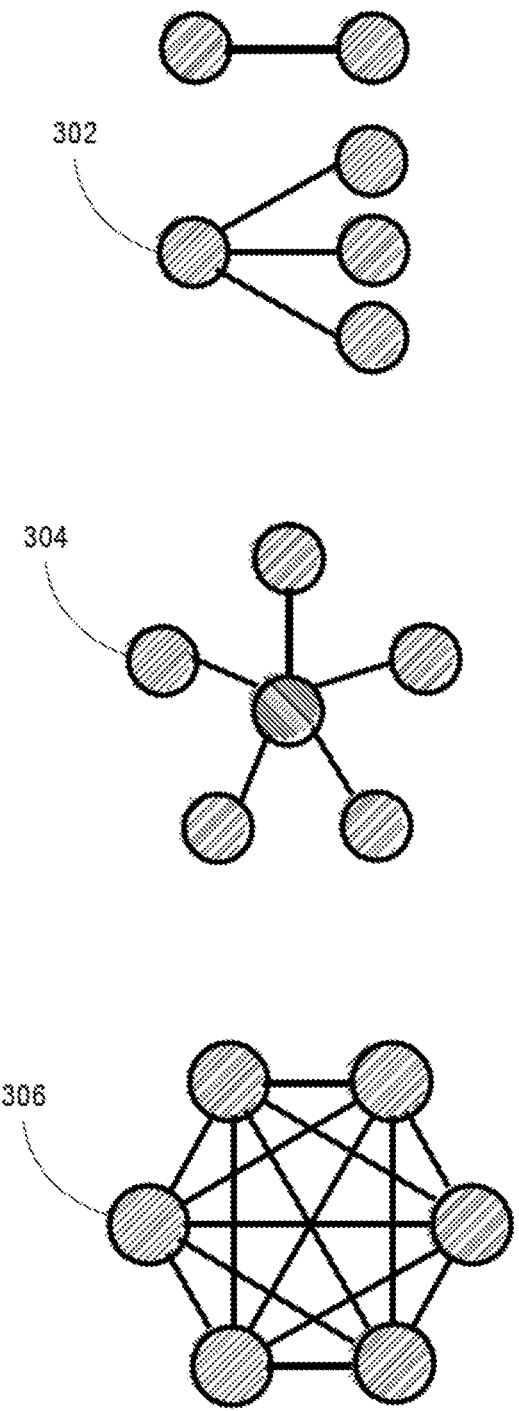
FIG. 3 is a diagram illustrating one example embodiment 300 of potential configurations of endpoint devices within various connected topologies.

FIG. 3 is a diagram illustrating one example embodiment 300 of potential configurations of personal and additional endpoint devices within various connected topologies. Such topologies represent an example of how endpoint devices may be communicatively connected to one another.

Topology 302 represents point-to-point and point-to-multipoint topologies, wherein a single connection interface functions to connect one endpoint device to another endpoint device. A single endpoint device can be connected to multiple endpoint devices in such a fashion. One example of a connection interface for such topologies is Bluetooth technologies.

Topology 304 represents a star topology, wherein data passes from a sender, such as a processing engine, to a central controller which acts as a central hub node, and then to multiple endpoint devices which act as destination nodes. A wi-fi router is one example of a device which may enable such connections between devices. A live streaming video controller may also provide the ability to connect multiple endpoint devices for a video streaming context.

Topology 306 represents a mesh topology, wherein data can be exchanged with any neighboring endpoint device in the setup. If the receiver is not within range, the data is passed from endpoint device to endpoint device until it reaches the destination device. This mesh topology may be enabled by, e.g., Bluetooth mesh technology or other mesh technology.

Other network topologies which may be used to communicatively connect the devices may include, e.g., partially or fully connected mesh networks, ring topology, bus topology, hybrid topology, or any other suitable network topology.

Returning to FIG. 2A, step 202, in some embodiments, the system can identify the personal endpoint device by retrieving information about connected devices from the processing engine, central controller, network devices, or any other device capable of identifying connected endpoint devices within the system. In some embodiments, one or more personal or additional endpoint devices may be pinged or otherwise sent data upon request of a network device to verify connection within the room.

At step 204, the system authenticates the personal endpoint device with respect to a single user account of a video communication platform. The system authenticates the user account associated with the personal endpoint device as legitimate and authorized prior to proceeding with further steps in optimizing the device and/or connecting to other devices. Authentication may be provided via one or more first party or third party authentication tools. Such authentication processes or techniques may include, e.g., multi-factor authentication (MFA), OAuth, OpenID Connect, SAML 2.0, a password, an RSA SecurID token, integrated authentication using a directory service, a client certificate, any other form of authentication, or a combination thereof. In some embodiments, a secondary login may be required other than a user's primary user account which requires separate authentication for purposes of optimization and connection to other endpoint devices. In some embodiments, one or more access control components or techniques may be provided for regulating access of the sending user account to various features. In some embodiments, access logging may be implemented in various ways. In some embodiments, a timeline or other document may be automatically generated with respect to a sending user account during or after the authentication process.

At step 206, the system performs one or more diagnostic operations to receive diagnostic output from the personal endpoint device. Diagnostic operations are operations performed by devices or components within the system for optimization, quality, issue diagnosis, data collection, or other purposes. Examples of such diagnostic operations may include operations, e.g., to determine a position of a capture device within a room, to determine the position of one or more presenters within a room, to diagnose and resolve a recording issue, to understand whether an endpoint device is facing a correct orientation with respect to a subject it is recording, to determine an optimal location of a microphone with respect to other microphones within a microphone array, and any other suitable diagnostic purpose.

Diagnostic output which the system received from a personal endpoint devices represents output data which has been captured by the personal endpoint device as a result of the diagnostic operations. Such endpoint data may include, e.g., captured audio recordings which were made in response to diagnostic operations, captured image and/or video recordings, prediction output regarding locations, orientations, quantity, and more of endpoint devices, presenters, participants, and more. For example, one diagnostic output may be a number of detected participants to a particular video session.

In some embodiments and examples, the diagnostic operations include a central controller or other device within the room being instructed by the system to emit an ultrasonic tone or other tone within the room. This ultrasonic tone, in turn, is captured via the audio inputs of the personal endpoint device. For example, any endpoint device capable of capturing audio may be instructed to capture the tone. In some embodiments, the personal endpoint device then sends the captured ultrasonic tone to the processing engine as diagnostic output from the personal endpoint device. The captured ultrasonic tone from the personal endpoint device can provide information to the processing engine about the locations and positions of the endpoint device which captured the tone. The audio capture quality and other aspects may be determined based on this captured recording as well.

In some embodiments, rather than an ultrasonic tone being emitted from a source, the diagnostic operations include instructing the personal endpoint device to record ambient environmental noise in the room, which then gets sent to the processing engine as diagnostic output from those endpoint devices. The captured ambient environmental noise will provide a basis for the processing engine to analyze the capabilities and characteristics of the different audio capturing devices, both in isolation and in comparison to one another.

In some embodiments, one or more presenters or others in the room may be asked to stand in various spots and speak as if presenting to the room. Capturing the resulting audio can be a form of diagnostic output from the endpoint devices.

Similarly to audio, in some embodiments, one or more visual diagnostic tests may be performed by a central controller or other device within the room in order to test various visual capabilities of cameras and other endpoint devices which are configured to capture video or other imagery. In some embodiments, the presents may be asked to stand in the places within the room they will be presenting, and the resulting captured video can be a form of diagnostic output from the endpoint devices.

In some embodiments, the system periodically determines a video conferencing context, then determines that the video conferencing context involves a subject that is currently off-screen. The system then determines the location and orientation of the off-screen subject, and adaptively switches from a first endpoint device to a second endpoint device capable of better capturing the off-screen subject.

Many other such diagnostic operations may be conducted to receive diagnostic output from personal and/or additional endpoint devices, depending on various needs and contexts within the video recording setup.

At step 208, the system processes the diagnostic output to determine a unique broadcasting signature of the room. In some embodiments, the diagnostic output takes the form of an audio or video recording received from the endpoint devices which can be used determine a unique broadcasting signature. A unique broadcasting signature of the room represents the unique sound qualities of the room, unique visual qualities of the room, and more. For example, the room may have a particular audio and/or visual fingerprint in terms of, e.g., the qualities of the ambient environment, one or more phenomena in the room, the way the device records within the room, where the device is positioned in the room, the visual look of the room, including objects which can be identified with the room, the colors of the room, cameras views within the room, speaker/presentation locations within the room, and more. In some embodiments, one or more audio analysis techniques are used to determine the approximate distance of recorded objects within the room from the personal endpoint device, as well as an approximate orientation of the device with respect to the recorded objects. The audio analysis techniques for determining a unique broadcasting signature for the room may include one or more of, e.g., acoustic source localization, monaural and binaural localization, time delay-based methods, beamforming-based methods, spectral estimation-based methods, use of microphone arrays, use of machine learning and neural network techniques, and any other suitable techniques for determining location and position from audio sources. In some embodiments, image analysis techniques may include, e.g., camera pose estimation using two-dimensional image datasets, histogram template matching, binary connectivity analysis, ellipse fitting, quadrature filter-based methods, and any other suitable techniques.

In some embodiments, the system determines the relative position of the endpoint device and/or one or more users in the room as part of the unique broadcasting signature. If the user is a presenter, for example, the user may wish to be at the head of a table, while a standard participant wishes to be seated at one of the sides of the table. Such different configurations may factor into the unique broadcasting signature of the room in various ways.

At step 210, the system determines whether an existing optimal settings configuration of the personal endpoint device can be detected for the room based on the unique broadcasting signature of the room. The optimal settings configuration represents optimized settings with respect to the personal endpoint device as it used within the specific room and its setup, to the extent that the system is able to optimize settings of that device for that room. For example, one optimized settings configuration may include changed settings regarding, e.g., a location of the device, orientation of the device, whether the device should be used in conjunction with one or more other detected endpoint devices in the room and how, lighting settings of the device, and/or one or more audio or video output quality settings of the device. Output quality may be made up of characteristics which are analyzed independently by the system, e.g., audio or video resolution, amount of compression, microphone or camera sensitivity, detected audio or video codec used, amount of audio or video artifacting or other similar aspects detected, or any other suitable criteria for output quality of audio or video. "Optimal" within the context of an optimal settings configuration need not indicate the most optimal settings possible, but rather can refer to a determination by the system of setting which may lead to a clear capture of presenters in the room in terms of a clear, full camera image, clear audio with no distortions and enough volume or gain to hear any speaker or audio distinctly, and other aspects or criteria which the system is trained or is predefined to be improved over settings prior to the system's determination of optimal settings configurations. One example of a non-optimal settings configuration is when a device's settings have been optimized for low light conditions in an outdoor setting, and then the same device is moved indoors to be used within a conference room to record a webinar. While some settings may be set to automatically change as a result of the device detecting different settings are needed, the system may still need to determine more optimal settings via processing the diagnostic output of the device.

In some embodiments, this determination can be performed by one or more artificial intelligence (AI) engines, algorithms, or processes which are trained on a dataset including both matches for existing optimal settings configurations with unique broadcasting signatures, and non-matches between configurations and signatures. In some embodiments, this is a labeled dataset. Machine learning (ML), computer vision, and/or other processes and techniques can be employed.

Figure 2B:
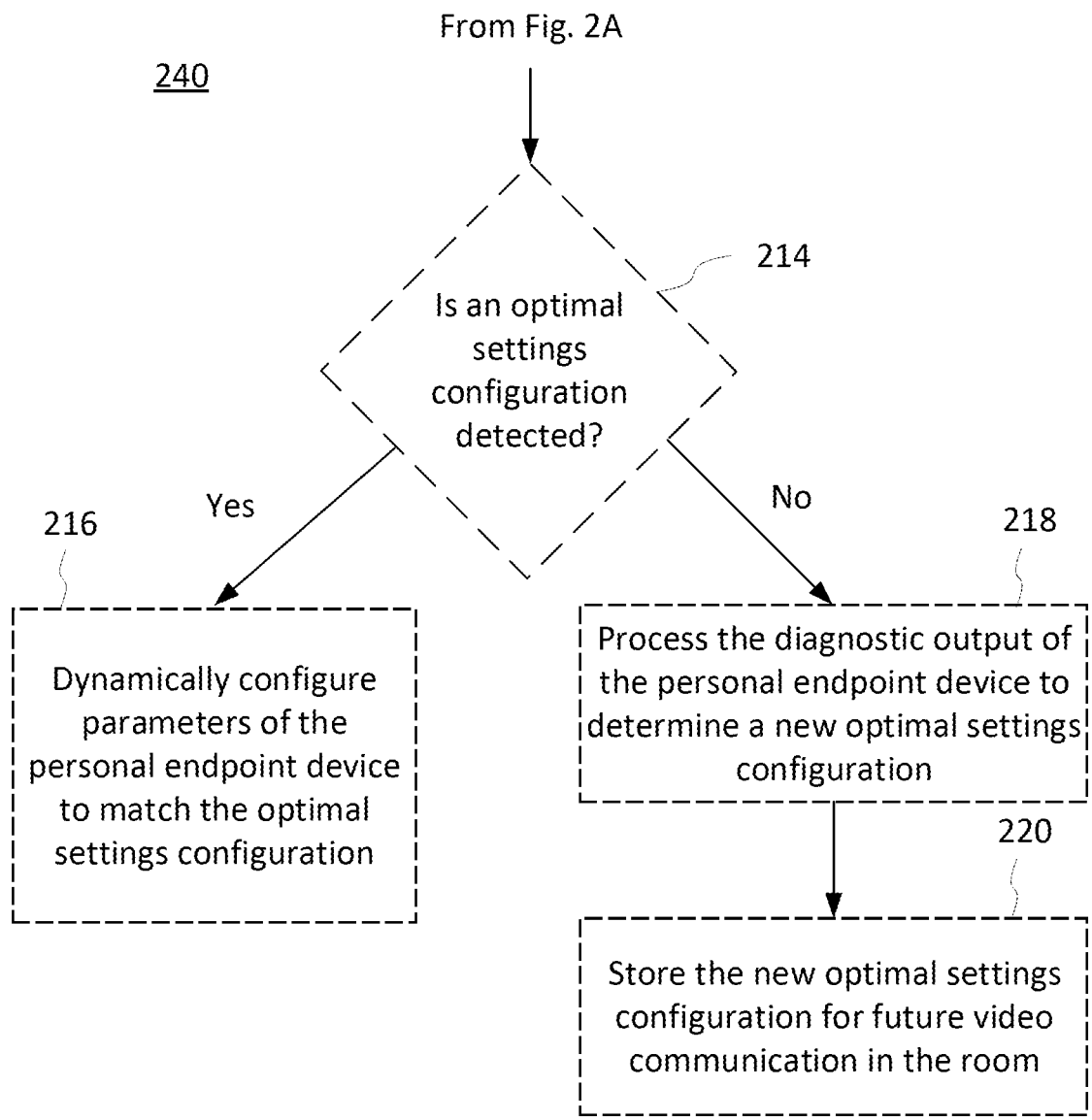
FIG. 2B is a flow chart illustrating an exemplary method 240 that may be performed in some embodiments.

FIG. 2B is a flow chart illustrating an exemplary method 240 that may be performed in some embodiments. FIG. 2B continues the steps of FIG. 2A.

At decision point 214, the system determines whether an optimal settings configuration can be detected, as described in FIG. 2A, step 210.

If such an existing configuration can be detected, then at step 216, the system dynamically configures parameters of the personal endpoint device to match the optimal settings configuration. In some embodiments, this step can be performed in real time or substantially real time upon the personal endpoint device being identified within the room. In some embodiments, the step involves the system detecting one or more changes to the room that alter the unique broadcasting signature of the room; adjusting one or more parameters of the personal endpoint device to account for the changes to the room; and storing the adjusted optimal settings configuration for future video communication in the room. Changes to the room that can alter the unique broadcasting signature of the room can include, for example, one or more additional endpoint device(s) being added or removed, lighting of the room changing, additional objects being added to the room which change the optimal location and position of the device to capture certain subjects, and more.

If no existing configuration can be detected, then at step 218, the system processes the diagnostic output of the personal endpoint device to determine a new optimal settings configuration, and at step 220, stores the new optimal settings configuration for future video communication in the room. In some embodiments, these steps can be performed in real time or substantially real time upon the personal endpoint device being identified within the room. In some embodiments, the system can store one or more of the diagnostic output, the unique broadcasting signature of the room, and/or the new optimal settings configuration as historical training data within a dataset; and then the system can use the historical training data within the dataset to train one or more AI engines for future video communication sessions within the room. AI engines and their use are described elsewhere in this application in relation to some embodiments.

In some embodiments, the system processes the diagnostic outputs along a number of criteria which may affect audio and video experience, such as, e.g., quantity of endpoint devices, location of endpoint devices, orientation of endpoint devices, and output quality of endpoint devices. By processing one or more of these criteria or other criteria, and comparing the results of the processing of the different endpoint devices to one another, the system can gain insights into how to improve configuration along the criteria. The system then determines, approximates, or predicts the optimal settings configurations of the endpoint devices.

For example, based on two audio recording devices with connected microphones capturing the sound of an audio tone being emitted in the room, the system can determine through processing that one of the microphones is positioned on a table in the room, while another of the microphones is positioned on the ceiling of the room. The system can compare the audio output characteristics of the two devices and determine that they are acoustically different in nature, and can determine further characteristics based on this analysis.

In some embodiments, one or more artificial intelligence (AI) engines can be used in whole or in part to process the diagnostic outputs and determine optimal settings configurations. Machine learning (ML), computer vision, and/or other processes and techniques can be employed. In some embodiments, the system trains one or more AI engines on a dataset which consists of various configurations of endpoint devices in different quantities, along with any other necessary information (such as, e.g., placement of presenters in the room and how loud each of their voices are). In some embodiments, the dataset is labeled with data such as whether the configuration is considered to be "optimal" or not. The engines becomes trained by ingesting a large amount of such data and learning what configurations would be optimal in certain conditions. The system then uses the AI engines to determine how to change suboptimal configurations to transform them into optimal configurations.

In some embodiments, upon determining the optimal settings configuration of the device, the system sends one or more notifications to users associated with at least one of the endpoint devices with respect to the optimal settings configurations of the endpoint devices. In some embodiments, the system automatically adjusts one or more output settings for at least one of the endpoint devices based on the optimal settings configurations of the endpoint devices. For example, the system may increase the volume of a video recorder if the input and/or output volume of the video recorded is too low to be heard properly.

In some embodiments, the system is configured to determine a video conferencing context with a number of presenters involved in the room. The system determines approximate locations and orientations of the presenters in the room based on the received diagnostic outputs from the endpoint devices, then determines optimal locations and orientations of at least a subset of the endpoint devices in the room based on the received diagnostic outputs from the endpoint devices, with the optimal locations and orientations corresponding to the approximate locations and orientations of the presenters. Notifications are then sent to users associated with the endpoint devices with respect to the optimal locations and orientations of the endpoint devices.

In some embodiments, the system is configured to determine a proximity and positioning of the endpoint devices to one another. The optimal settings configuration is then partially determined based on this proximity and positioning.

In some embodiments, determining a new optimal settings configuration involves first determining, beyond a confidence threshold, a match similarity of the unique broadcasting signature of the room to a unique broadcasting signature of an additional room for which an optimal settings configuration can be detected for the endpoint device, and second, dynamically configuring one or more parameters of the personal endpoint devices to match the optimal settings configuration of the additional room. In some embodiments, the match similarity can be determined by one or more AI engines (e.g., ML engines) trained on a dataset of unique broadcasting signatures being compared to other unique broadcasting signatures along various criteria.

In some embodiments, during, before or after one or more steps in the process, the system can display a room configuration interface at the personal endpoint device, including a first control interface for receiving a selection of an existing settings configuration for an additional room, and a second control interface for manually adjusting one or more parameters of the personal endpoint device with respect to the optimal settings configuration for that room. The room configuration interface allows a user to manually adjust various settings and parameters rather than the system automatically determining them. In some embodiments, any setting which the system can configure is a setting the user can also manually configure via the room configuration interface.

In some embodiments, the system detects an existing optimal settings configuration for the pairing of the personal endpoint device to at least one of the additional endpoint devices, where determining the new optimal settings configuration comprises dynamically adjusting one or more parameters of the personal endpoint device to match the existing optimal settings configuration of the pairing of the devices. In this way, devices can be paired together and work together with optimal settings configurations applied as a whole rather than just individually.

In some embodiments, the system receives a selection of an automatable behavior to be performed with the room upon identifying the personal endpoint device within the room and beginning a video communication session. The system then stores the selection of the automatable behavior to be automatically performed at a future session within the room upon the personal endpoint being detected. An automatable behavior to be performed with the room may include, for example, the user always closing curtains in the room before starting a video session, or always dimming the lights slightly. The user may always turn a projector in the room on. If such behaviors can be automated by the system, then they can be automatically performed upon the user entering the room. For example, if the lighting system is communicatively connected to the personal endpoint device, then the lights can be adjusted automatically in this way. In some embodiments, the system determines one or more routine behaviors of the user account with respect to video communication sessions conducted with the personal endpoint device within the room, then adjusts one or more parameters of the optimal settings configuration of the personal device based on the routine behaviors. Similar to automatable behaviors, routine behaviors with respect to video communication sessions may include always turning on the camera before starting the session and adjusting various settings prior to recording, such as lighting, touching up the user's appearance, focus, and more. In some embodiments, routine behavior may include attending a recurring video communication session with a specific group of other users during a specific time. Adjusting the one or more parameters of the optimal settings configuration based on the routine behaviors includes detecting one or more user behaviors during the communication session which can be optimized by adjusting settings of the personal endpoint device.

Other examples of automatable and/or routine behaviors may include: a user always using a top-down camera to demonstrate products as compared to a user always using cameras at a far end of the room to show himself, a user always closing shades and a user that never does, and a user who always uses a specific audio device in a larger space (i.e., a wireless microphone being used by the CEO of the company) as compared to a user that always uses the room's system audio.

In some embodiments, the system is configured to cache one or more optimal settings configurations of the device for the room and/or additional rooms such that the configurations can be imported and accessed without the personal endpoint device being connected to a network or device. Any of a number of potential caching algorithms and processes can be used to perform the caching operations.

In some embodiments, the system can detect one or more changes to the unique broadcasting signature of the room during a video communication session and then dynamically adjust, in real time or substantially real time, one or more parameters of the personal endpoint device to determine a new optimal settings configuration for the personal endpoint device to account for the changes. This can occur midway through a presentation, for example, while the personal endpoint device is occurring. For example, in the middle of a broadcast, the lighting can change in the room such that new settings will be necessary, or the camera's focus may become blurry. A microphone may pick up a loud noise which has started occurring in the background which muffles someone speaking as a presenter. In such situations, different optimal settings can be configured on the fly to account for the change in situation.

Figure 4:
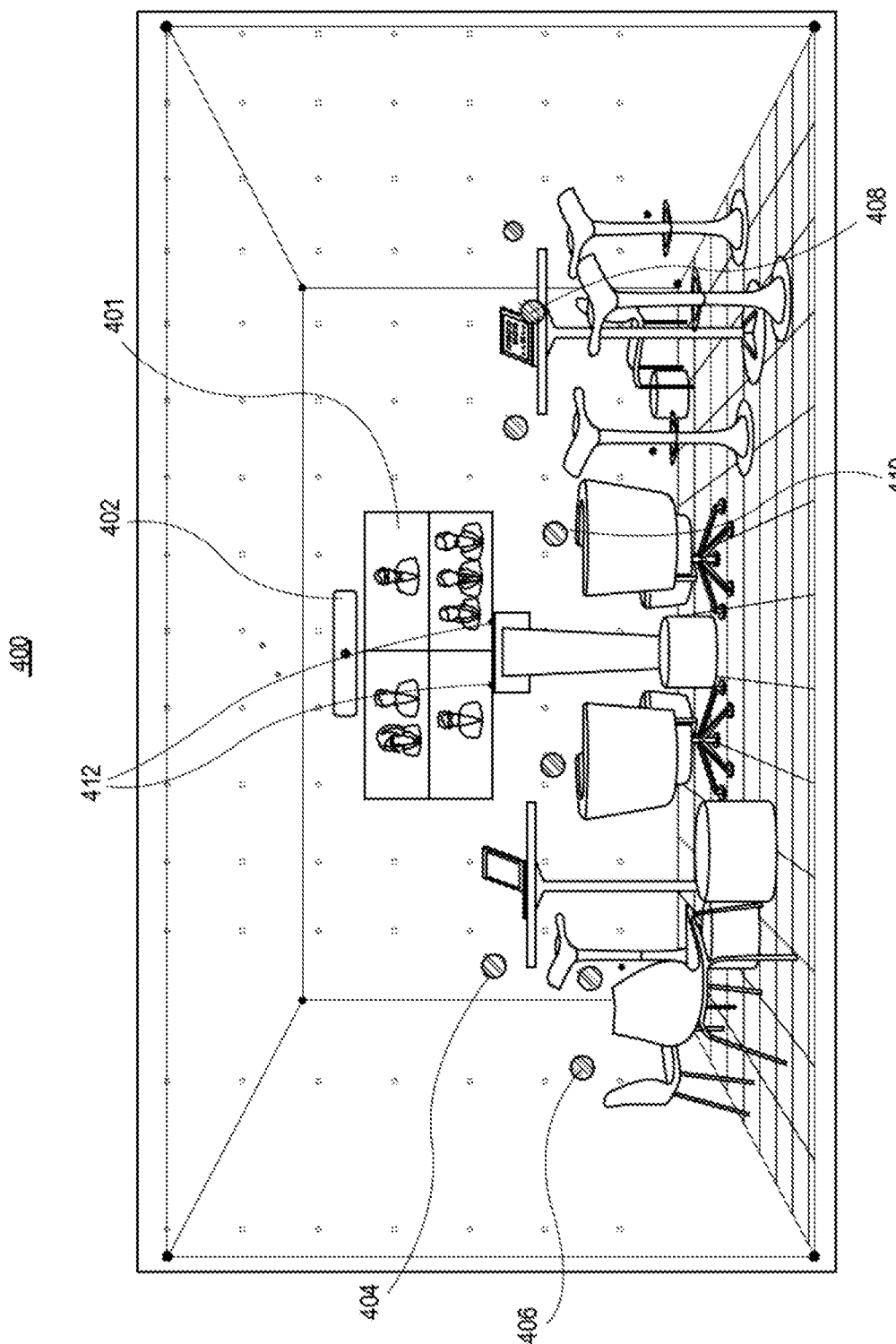
FIG. 4 is a diagram illustrating one example embodiment 400 of a video conferencing setup where intelligent configurations are determined for the endpoint devices in the room, in accordance with some embodiments.

FIG. 4 is a diagram illustrating one example embodiment 400 of a video conferencing setup where intelligent configurations are determined for the endpoint devices in the room, in accordance with some embodiments.

The example embodiment 400 illustrates a video conferencing room. Within the room, multiple endpoint devices are set up to capture the audio and/or video of video conferencing participants. A monitor 401 is also set up to play audio and/or video from live streams of four other video conference rooms, which are connected remotely within the video conferencing session. The video conference thus includes several people from different remote and local rooms, leading to a hybrid conference meeting composed of far-end and near-end participants.

A number of potential endpoint devices and participant configurations are possible within the depicted setup. First, an overheard video camera 402 captures video as well as audio of the participants from an overheard angle. The system may detect the audio as coming from an overhead device because the acoustic properties are different. The system may also process diagnostic output from the overheard camera to note that due to the fixed nature of the overhead camera, there are limited potential location and position settings which may be allowed for the device. However, it may still be possible for such parameters as video camera quality to be modified to fit an optimal settings configuration.

Next, a laptop computer 404 sits on a high table, next to a participant's chair as well as two different lower participants' seats.

Figure 5:
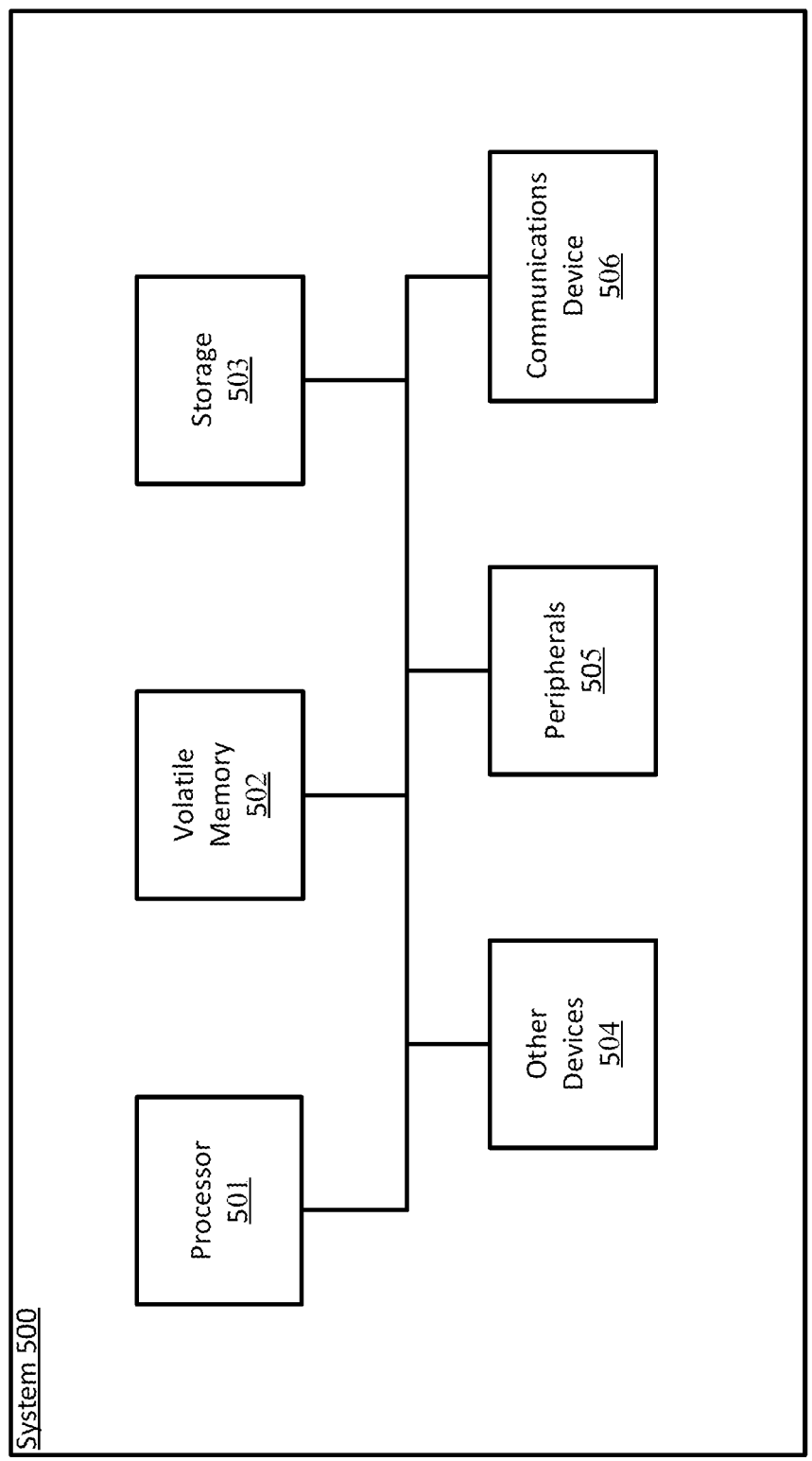
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing intelligent configuration of personal endpoint devices for video communication, comprising:
    identifying, within a room, a personal endpoint device to be used in a video communication session;
    authenticating the personal endpoint device with respect to a single user account of a video communication platform;
    performing one or more diagnostic operations to receive diagnostic output comprising captured audio media and visual media from the personal endpoint device;
    processing the diagnostic output to determine a unique audiovisual broadcasting signature of the room, the unique audiovisual broadcasting signature comprising a plurality of audio and visual qualities of the room;
    determining whether an existing optimal settings configuration for audiovisual output quality of the personal endpoint device can be detected for the room based on the unique audiovisual broadcasting signature of the room;
    if an optimal settings configuration is detected, dynamically configuring one or more parameters of the personal endpoint device to match the optimal settings configuration; and
    if an optimal settings configuration is not detected:
        processing the diagnostic output of the personal endpoint device to determine a new optimal settings configuration, and
        storing the new optimal settings configuration for future video communication in the room.

2. The method of claim 1, wherein identifying the personal endpoint device comprises communicatively connecting the personal endpoint device to one or more additional endpoint devices over a network.

3. The method of claim 1, wherein determining a new optimal settings configuration comprises:
    determining, beyond a confidence threshold, a match similarity of the unique audiovisual broadcasting signature of the room to a unique audiovisual broadcasting signature of an additional room for which an optimal settings configuration for audiovisual output quality can be detected for the endpoint device; and
    dynamically configuring one or more parameters of the personal endpoint devices to match the optimal settings configuration for audiovisual output quality of the of the additional room.

4. The method of claim 1, further comprising:
    training one or more artificial intelligence (AI) engines on a dataset comprising various configurations of personal endpoint devices within rooms of differing unique audiovisual broadcasting signatures,
    wherein the processing of the diagnostic output to determine a new optimal settings configuration for audiovisual output quality of the personal endpoint device is executed by the one or more AI engines.

5. The method of claim 4, wherein the processing of the diagnostic output to determine a unique audiovisual broadcasting signature of the room is executed by the one or more AI engines.

6. The method of claim 1, wherein dynamically configuring one or more parameters of the personal endpoint device to match the optimal settings configuration comprises:
    detecting one or more changes to the room that alter the unique audiovisual broadcasting signature of the room;
    adjusting one or more parameters of the personal endpoint device to account for the changes to the room; and
    storing the adjusted optimal settings configuration for future video communication in the room.

7. The method of claim 1, wherein one or more steps are performed in real time or substantially real time upon the personal endpoint device being identified within the room.

8. The method of claim 1, further comprising:
    displaying a room configuration interface at the personal endpoint device, the room configuration interface comprising:
    a first control interface for receiving a selection of an existing settings configuration for an additional room; and
    a second control interface for manually adjusting one or more parameters of the personal endpoint device with respect to the optimal settings configuration for audiovisual output quality for that room.

9. The method of claim 1, further comprising:
    communicatively connecting the personal endpoint device to one or more additional endpoint devices within the room.

10. The method of claim 9, further comprising:
    detecting an existing optimal settings configuration for audiovisual output quality for the pairing of the personal endpoint device to at least one of the additional endpoint devices,
    wherein determining the new optimal settings configuration comprises dynamically adjusting one or more parameters of the personal endpoint device to match the existing optimal settings configuration for audiovisual output quality of the pairing of the devices.

11. The method of claim 1, further comprising:
receiving a selection of an automatable behavior to be performed with the room upon identifying the personal endpoint device within the room and beginning a video communication session;
storing the selection of the automatable behavior to be automatically performed at a future session within the room upon the personal endpoint being detected.

12. The method of claim 1, wherein a central controller is configured to identify the personal endpoint device within the room and communicatively connect with the personal endpoint device.

13. The method of claim 1, further comprising:
storing one or more of the diagnostic output, the unique audiovisual broadcasting signature of the room, and/or the new optimal settings configuration as historical training data within a dataset; and
using the historical training data within the dataset to train one or more AI engines for future video communication sessions within the room.

14. The method of claim 1, further comprising:
determining one or more routine behaviors of the user account with respect to video communication sessions conducted with the personal endpoint device within the room; and
adjusting one or more parameters of the optimal settings configuration for audiovisual output quality of the personal device based on the routine behaviors.

15. The method of claim 14, wherein the one or more routine behaviors comprises attending a recurring video communication session with a specific group of other users during a specific time, and wherein adjusting the one or more parameters of the optimal settings configuration for audiovisual output quality based on the routine behaviors comprises detecting one or more user behaviors during the communication session which can be optimized by adjusting settings of the personal endpoint device.

16. A communication system comprising one or more processors configured to perform the operations of:
identifying, within a room, a personal endpoint device to be used in a video communication session;
authenticating the personal endpoint device with respect to a single user account of a video communication platform;
performing one or more diagnostic operations to receive diagnostic output comprising captured audio media and visual media from the personal endpoint device;
processing the diagnostic output to determine a unique audiovisual broadcasting signature of the room, the unique audiovisual broadcasting signature comprising a plurality of audio and visual qualities of the room;
determining whether an existing optimal settings configuration for audiovisual output quality of the personal endpoint device can be detected for the room based on the unique audiovisual broadcasting signature of the room;
if an optimal settings configuration is detected, dynamically configuring one or more parameters of the personal endpoint device to match the optimal settings configuration; and
if an optimal settings configuration is not detected:
processing the diagnostic output of the personal endpoint device to determine a new optimal settings configuration, and
storing the new optimal settings configuration for future video communication in the room.

17. The communication system of claim 16, wherein the processors are further configured to perform the operations of:
one or more automatable devices within the room which are communicatively connected to the personal endpoint device over a network.

18. The communication system of claim 16, wherein the processors are further configured to perform the operations of:
caching one or more optimal settings configurations for audiovisual output quality of the device for the room and/or additional rooms such that the configurations can be imported and accessed without the personal endpoint device being connected to a network or device.

19. The communication system of claim 16, wherein the personal endpoint device and one or more additional devices are configured to connect with one another via one or more signaling and/or beaconing technologies.

20. The communication system of claim 16, wherein the processors are further configured to perform the operations of:
detecting one or more changes to the unique audiovisual broadcasting signature of the room during a video communication session; and
dynamically adjusting, in real time or substantially real time, one or more parameters of the personal endpoint device to determine a new optimal settings configuration for the personal endpoint device to account for the changes.

* * * * *